United States Patent
Sheng et al.

(10) Patent No.: US 9,335,774 B1
(45) Date of Patent: May 10, 2016

(54) NON-ISOLATED INTERMEDIATE BUS CONVERTER

(75) Inventors: Honggang Sheng, Milpitas, CA (US); Sangsun Kim, San Jose, CA (US); Cornelius B. O'Sullivan, Mountain View, CA (US)

(73) Assignee: Google Inc., Mountain View, CA (US)

( * ) Notice: Subject to any disclaimer, the term of this patent is extended or adjusted under 35 U.S.C. 154(b) by 955 days.

(21) Appl. No.: 13/467,299

(22) Filed: May 9, 2012

(51) Int. Cl.
*G05F 1/59* (2006.01)
*G05F 1/577* (2006.01)
*H02M 1/00* (2006.01)

(52) U.S. Cl.
CPC ......... *G05F 1/577* (2013.01); *H02M 2001/009* (2013.01)

(58) Field of Classification Search
None
See application file for complete search history.

(56) References Cited

U.S. PATENT DOCUMENTS

| | | | |
|---|---|---|---|
| 7,456,617 B2* | 11/2008 | Chapuis | G06F 1/26 323/266 |
| 7,882,372 B2* | 2/2011 | Chapuis et al. | 713/300 |
| 2011/0038189 A1* | 2/2011 | Whittam | H02J 1/00 363/84 |

* cited by examiner

*Primary Examiner* — Thienvu Tran
*Assistant Examiner* — David M Stables
(74) *Attorney, Agent, or Firm* — Fish & Richardson P.C.

(57) ABSTRACT

In many aspects, the systems and methods described herein include circuitry for an intermediate bus converter for use in a datacenter. The systems and methods described herein describe an intermediate bus converter comprising power stage circuitry, comprising a non-isolated converter, configured to convert a DC source voltage to one or more DC output voltages, wherein the DC source voltage is received from a front-end AC-to-DC converter. The intermediate bus converter further comprising controller circuitry configured to receive both the DC source voltage and the DC output voltage, and generate an at least one control signal to control the operation of the power stage circuitry.

15 Claims, 8 Drawing Sheets

100

100

700

800

NON-ISOLATED INTERMEDIATE BUS CONVERTER

BACKGROUND

Modern datacenters typically use an intermediate bus architecture to deliver power from the power distribution center down to server components. The intermediate bus architecture has three main components: AC to DC voltage converter, intermediate DC to DC converter and Point of Load DC to DC converter. The AC to DC voltage converter converts an initial AC voltage into an intermediate DC voltage. The intermediate DC voltage is then converted into a lower DC voltage using an intermediate bus converter. The intermediate bus converter is generally implemented using an isolated structure in order to protect the server components from power faults that propagate from the front-end AC/DC converter. The lower DC voltage is then used by multiple POL converters to provide different voltages that power the server components.

The problem with current-day intermediate bus architectures is that the different components are becoming bulky in size and expensive. In particular, the intermediate bus converter (IBC) has become increasingly expensive and bulky. This is because typical IBCs contain many different components such as transformers, secondary rectifiers, isolation circuitry for signal and power, and ground loop circuitry.

SUMMARY

As noted earlier, the intermediate bus converter (IBC) is a power converter that is implemented using an isolated structure. An isolated structure is typically one where the input side and the power converter is electrically isolated from the output side by a component such as a mutual inductor. One reason for implementing the IBC in an isolated structure is to provide protection to the server components from the distribution center. If a power spike occurs at the distribution center, the isolated IBC structure shields the POL converters, which typically have no isolation, protecting the server components from damage caused by the power spike. For this reason, isolation at the IBC is still considered mandatory. But these isolated IBCs are bulky. The additional circuitry needed to provide isolation is the main source of the size and cost of the IBC. This is because typical IBCs require components such as transformers, secondary rectifiers, isolation circuitry for signal and power, and ground loop circuitry, to provide the isolation.

However, the original intermediate bus architecture was designed with telecommunication systems in mind. The fear of damage caused by a power spike from the distribution center is often based on the occurrences of similar power spikes in telecommunication systems. In telecommunication systems, power spikes cause damage to components connected to the output of the intermediate bus converter. These telecommunication systems included IBCs with bulky isolated structures. In modern datacenters, these spikes do not occur, but IBCs having isolated structures are commonly found as an over-provisioned safety requirement. The present disclosure presents changes to the typical intermediate bus architecture which help reduce the size of the components within the intermediate bus architecture.

To achieve this improvement, the intermediate bus converter in the typical intermediate bus architecture may be replaced with non-isolated IBC circuitry. In particular, the bulky components within isolated IBC circuitry, such as transformers, secondary rectifiers, isolation circuitry for signal and power, and ground loop circuitry, and may be removed. This reduces the size of the IBC because these components are usually the largest pieces of the IBC. Additionally, because isolation is not required within the IBC, the input circuitry may be electrically connected to the output circuitry. Consequently, both the input power as well as the output power to the IBC may be used to power the controller circuitry. This allows fewer external power sources to be needed, thus improving power efficiency and reducing the size of the IBC. Furthermore, non-isolated topologies, including multiphase topologies, improve power efficiency because the power stage circuitry within the IBC may be tuned to deliver the specific power demanded by the system components. Moreover, by removing the need for the transformer, the non-isolated IBC may operate at voltages close to the output voltage. Consequently, backup battery systems may be able to operate for longer periods of time using non-isolated IBCs. As the charge within the backup battery system is depleted during power failures, the voltage delivered by the battery starts to drop. Unlike isolated IBCs, which typically operate at fixed input voltages much higher than the output voltage, non-isolated IBCs are able to operate at voltages close to the output voltage, allowing the voltage delivered by the battery to drop to a value close to the output voltage while continuing to produce the correct output voltage. Each of these features reduces the size and improves the power efficiency of the intermediate bus architecture.

Generally, the systems and methods described herein are directed to an intermediate bus converter. More particularly, in one aspect, the systems and methods described herein include an intermediate bus converter for use in a datacenter. The converter may include power stage circuitry, comprising a non-isolated converter, configured to convert a DC source voltage to one or more DC output voltage. The converter may further include controller circuitry configured to receive both the DC source voltage and the DC output voltage, and generate an at least one control signal to control the operation of the power stage circuitry. In certain implementations, the non-isolated converter comprises one of a buck converter, a boost converter, or a buck-boost converter. In certain implementations, the non-isolated converter also may comprise a synchronous converter.

In certain implementations, the non-isolated converter may also comprise a multiphase converter comprising a plurality of phase circuitry. The signals generated by the converter may further control the operation of the plurality of phase circuitry. The controller circuitry may further be configured to determine a power demand, wherein the power demand is the amount of power that the IBC is expected to produce, determine a number of phase circuitry among the plurality of phase circuitry needed to provide the determined power demand, and control the operation of the determined number of phase circuitry. In certain implementations, the controller circuitry may be configured to determine whether a power requirement event has occurred. The power requirement event may indicate whether the power demand expected by the IBC has changed. The controller circuitry may further be configured to then determine a second power demand, determine a second number of phase circuitry among the plurality of phase circuitry needed to provide the determined second power demand, and control the operation of the determined second number of phase circuitry if a power requirement event has occurred.

In certain implementations, the controller circuitry in the IBC may include a power selection circuitry to select between the DC source voltage and the one or more DC output voltages. The controller circuitry may also include power delivery circuitry to convert the selected power source into a power source usable by the controller circuitry. The controller circuitry may further include gate driver, sensing signals, and control circuitry for generating the at least one control signal to control the operation of the power stage circuitry.

In another aspect, the systems and methods described herein include methods for operating an intermediate bus converter. The methods may include receiving a DC source voltage. The methods may further include generating, using controller circuitry, at least one control signal, and controlling the operation of power stage circuitry using at least one control signal, wherein the power stage circuitry includes a non-isolated converter. The methods may further include converting the DC source voltage to one or more DC output voltages using the power stage circuitry. In certain implementations, the non-isolated converter may include a multiphase converter comprising a plurality of phase circuitry.

In certain implementations, controlling the operation of the power stage circuitry may comprise determining a power demand, wherein the power demand is the amount of power that the IBC is expected to produce. Controlling the operation of the power stage may then further include determining a number of phase circuitry among a plurality of phase circuitry needed to provide the determined power demand. Then at least one phase control signal may be generated using the controller circuitry. The phase control signals may then be used to control the operation of the determined number of phase circuitry. In certain implementations, controlling the operation of the power stage circuitry may further comprise determining whether a power requirement event has occurred. The power requirement event may indicate whether the power demanded by the IBC has changed. Examples of changes in power demand are changes in load power conditions of the IBC, and changes in system power demand. The number of phase circuitry used may be based on the load power condition or the system power demand. Phase circuitry may be turned on in response to an increase in the power demand. Phase circuitry may also be turned off in response to a decrease in the power demand. In certain implementations, the power requirement event may indicate whether the power demanded by the IBC is expected to change. A second power demand is determined if a power requirement event has occurred. Once a second power demand is determined, the number of phase circuitry based on the second power demand is determined.

In certain implementations, the method of generating at least one control signal may further include receiving, at the controller circuitry, both the DC source voltage and the one or more DC output voltage. The methods may further include powering the controller circuitry using the DC source voltage, and determining whether at least one DC output voltages among the one or more DC output voltages has stabilized. In response to determining at least one DC output voltage has stabilized, the methods may then include powering the controller circuitry using one of the stabilized DC output voltages.

In another aspect, the systems and methods described herein include systems in a datacenter. The datacenter may include a front-end AC-to-DC converter, a non-isolated intermediate bus converter, a plurality of point-of-load converters, and a plurality of network elements. The front-end AC-to-DC converter may receive a high voltage AC signal greater than 100 volts and generate a DC front-end voltage. The non-isolated intermediate bus converter may further include power stage circuitry and controller circuitry. The power stage circuitry may receive a DC source voltage based on the DC front-end voltage and generate a DC output voltage. The controller circuitry may be connected to the power stage circuitry and configured to receive both the DC source voltage and the DC output voltage, and generate a control signal to control the operation of the power stage circuitry. The point-of-load converters receive the DC output voltage and are in communication with the network elements.

In another aspect, the systems and methods described herein include systems in a datacenter. The datacenter includes a front-end AC-to-DC converter, a non-isolated intermediate bus converter, backup battery circuitry, DC voltage selection circuitry, a plurality of point-of-load converters, and a plurality of network elements. The front-end AC-to-DC converter may receive a high voltage AC signal greater than 100 volts and generate a first DC source voltage. The backup battery circuitry may include one or more battery cells. The backup battery circuitry receives a DC voltage based on the first DC source voltage and may be configured to generate a second DC source voltage. The received DC voltage based on the first DC voltage may be used to charge the one or more battery cells in the backup battery circuitry. The DC voltage selection circuitry receives both a DC voltage based on the first DC source voltage and a DC voltage based on the second DC source voltage. The DC voltage selection circuitry selects among the received DC voltages and delivers a selected DC source voltage to the power stage circuitry. The non-isolated intermediate bus converter may include power stage circuitry and controller circuitry. The power stage circuitry may receive a DC voltage based on the selected DC source voltage and generate a DC output voltage. The controller circuitry is connected to the power stage circuitry and configured to receive both the selected DC source voltage and the DC output voltage, and generate a control signal to control the operation of the power stage circuitry. The point-of-load converters receive the DC output voltage and are in communication with the network elements.

In certain implementations, the DC voltage selection circuitry may be configured to determine if a power event has occurred, and select the selected DC source voltage to deliver among the received DC voltages based on whether a power event has occurred. A power event may indicate a power failure affecting the delivery of the DC voltage based on the first DC source voltage.

In certain implementations, the datacenter may include power failure control circuitry configured to compare the first DC source voltage with a pre-determined voltage. The power failure control circuitry may determine if the first DC source voltage is within a pre-determined DC voltage threshold of the pre-determined voltage. If a determination is made that the first DC source voltage is within the pre-determined DC voltage threshold of the pre-determined voltage, the power failure control circuitry may indicate to the DC voltage selection circuitry to select the first DC source voltage. If a determination is made that the first DC source voltage is outside the pre-determined DC voltage threshold of the pre-determined voltage, the power failure control circuitry may indicate to the DC voltage selection circuitry to select the second DC source voltage.

BRIEF DESCRIPTION OF THE DRAWINGS

The above and other advantages of the disclosure will be apparent upon consideration of the following detailed description, taken in conjunction with the accompanying drawings, in which like reference characters refer to like parts throughout, and in which.

DETAILED DESCRIPTION

To provide an overall understanding of the disclosure, certain illustrative implementations will now be described, including systems and methods for a non-isolated intermediate bus convertor. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

The systems and methods described herein are directed to intermediate bus converters having non-isolated structures. The systems and methods described herein further include controllers for managing input and output power in non-isolated IBCS to improve power efficiency. To further improve efficiency, the present disclosure also includes multiphase non-isolated IBCs.

Intermediate Bus Architecture

Figure 1:
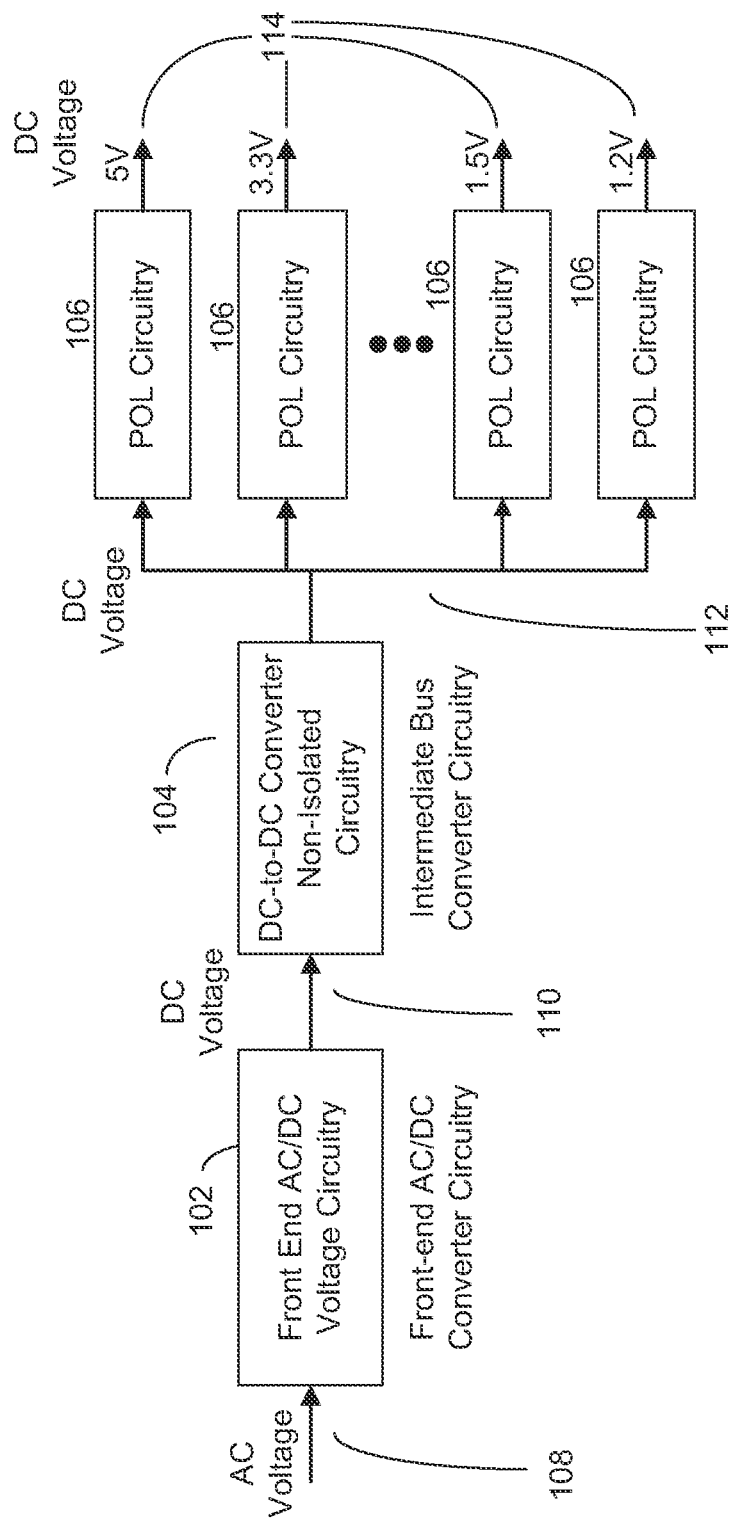
FIG. 1 is a block diagram depicting an implementation of an intermediate bus architecture, according to an illustrative implementation of the disclosure.

FIG. 1 shows a block diagram depicting an implementation of the intermediate bus architecture 100, according to an illustrative implementation of the disclosure. The depicted power-conversion architecture 100 includes components that convert an initial AC input voltage 108 into multiple DC voltages 114 which may be used by different network and server components in the datacenter. High voltage AC is typically delivered from a distribution center to the datacenter. The high voltage AC may be stepped down to a lower voltage AC 108 using transformers. The lower voltage AC 108 is then distributed to server racks to be converted to DC voltage which may used by servers and other datacenter components. The AC voltage 108 is converted into a first DC voltage 110 by front-end AC/DC voltage circuitry 102. The first DC voltage 110 is then converted into a lower DC voltage 112 by intermediate bus converter circuitry 104. As described in more detail with reference to FIG. 2, the intermediate bus converter circuitry 104 includes a non-isolated converter circuitry. The lower DC voltage 112 is then used by multiple POL converters 106 to provide different voltages 114 that power the server components. For example, the high voltage AC may be 480V from the distribution center, which is then converted to a lower voltage AC 108 between 120-208V. The lower voltage AC 108 may then be converted to a first DC voltage 110 of 48V. The first DC voltage 110 may then be converted lower DC voltage 112, which may be 5V, 9V, or 12V. The lower DC voltage 112 may then be converted to a voltage 114 that powers the server components, which may be 1.2V, 1.5V, 3.3V or 5V. The voltages described are examples of voltages that may be used. The power-conversion architecture 100 may be configured to convert any combination of voltages.

Figure 2:
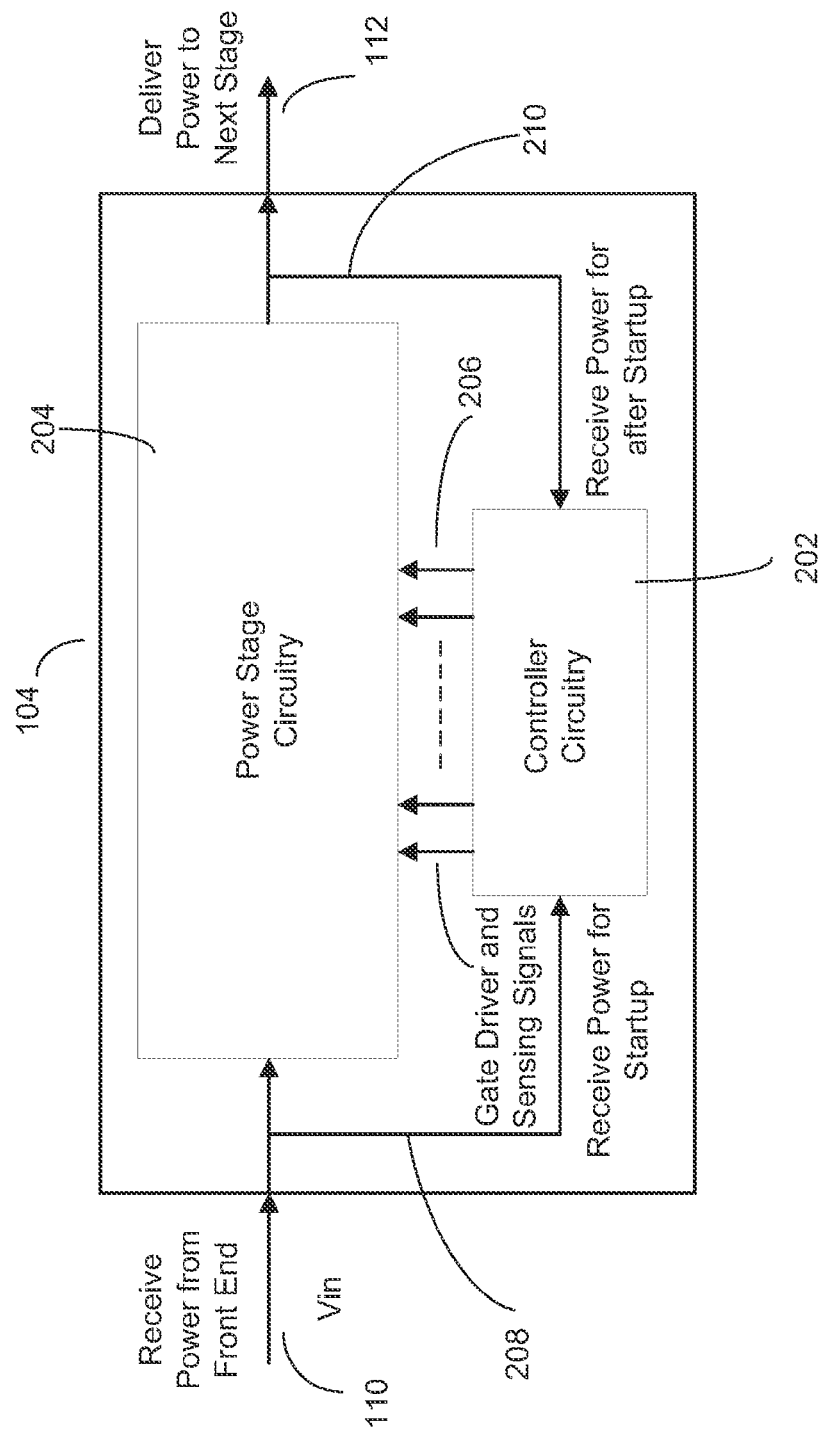
FIG. 2 is a block diagram depicting an implementation of a non-isolated intermediate bus converter (IBC), according to an illustrative implementation of the disclosure.

FIG. 2 shows a block diagram depicting an implementation of the non-isolated intermediate bus converter circuitry (IBC) 104, according to an illustrative implementation of the disclosure. The non-isolated IBC circuitry 104 receives a first DC voltage 110 from the AC/DC voltage circuitry 104. The non-isolated IBC converts DC voltage 110 into a lower DC voltage 112, which then may be used by the components of a server. The non-isolated IBC 104 includes at least two components: power stage circuitry 204 and controller circuitry 202. The power stage circuitry 204 contains the circuitry which converters the input voltage 208 to the desired output voltage 210. In certain implementations, the power stage circuitry 204 includes a multi-phase synchronous buck converter. Depending on the polarity of the input voltage 110, the power stage circuitry 204 may include a multi-phase synchronous buck-boost converter. To control the power stage circuitry 204, controller circuitry 202 generates gate driver and sensing signals 206, which are used by the power stage circuitry 204 to control input and output power.

Typically in current-day isolated IBCs, extra power sources are needed to power the controller circuitry. Specifically, to maintain isolation, extra circuitry is added in order to generate and deliver isolated power to the controller circuitry. This added circuitry decreases the power efficiency of the IBC. By using a non-isolated IBC 104, the controller circuitry 202 does not have to maintain isolation and may use the output voltage 210 of the IBC 104 to power itself after startup. By using the output voltage 210 after the IBC 104 has started up, the controller circuitry 202 improves the power efficiency of the IBC 104 as a whole because the extra circuitry is not included. In certain implementations, the controller circuitry 202 is powered by both the input voltage 208 and output voltage 210. The controller circuitry 202 may be powered by at least one of the input voltage 208 and the output voltage 210. Depending on a mode of operation, the controller circuitry 202 selects which voltage to use as its power source.

Figure 3:
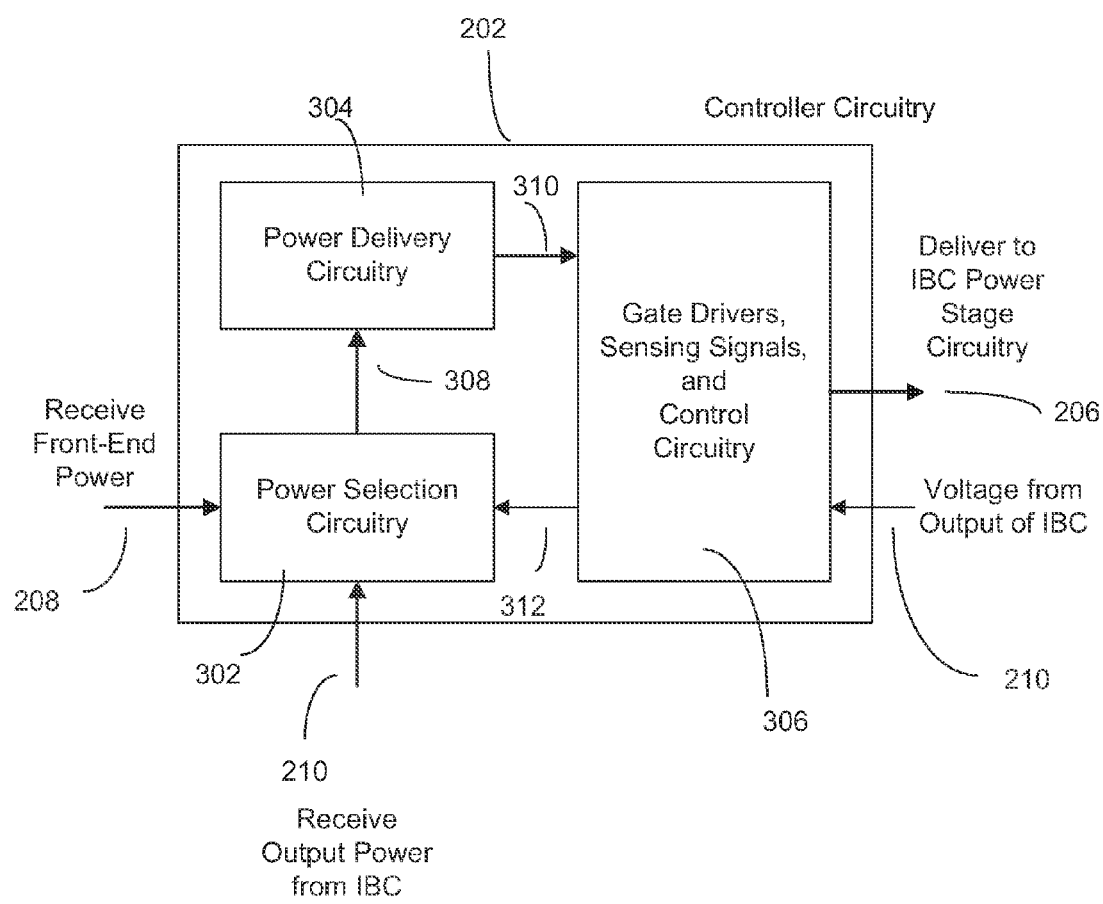
FIG. 3 is a block diagram depicting an implementation of controller circuitry in communication with the non-isolated IBC, according to an illustrative implementation of the disclosure.

FIG. 3 shows a block diagram depicting an implementation of the controller circuitry 202, according to an illustrative implementation of the disclosure. The controller circuitry 202 generates the gate drivers and sensing signals 206 that control the operation of the power stage circuitry 204. The controller circuitry 202 includes a power delivery circuitry 304, a power selection circuitry 302 and circuitry 306.

The controller circuitry 202 receives at least one, and at times both, the input voltage 208, which originates from the output 110 of the front end AC/DC converter 102, and the output voltage 210, which is generated by the power stage circuitry 204 of the IBC 104. The power selection circuitry 302 receives the input voltage 208 and output voltage 210 and selects which voltage should be used to power the controller circuitry 202. In certain implementations, the power selection circuitry 302 selects one of the input and output voltage based on determining whether the output 210 of the power stage circuitry 204 of the IBC 104 has stabilized. The power selection circuitry 302 checks the output 210 of the power stage circuitry 204 to determine whether the output 210 has stabilized or whether it has reached a predetermined voltage. If the output 210 of the power stage circuitry 204 has not stabilized or the predetermined voltage has not been reached then the output 210 may not be reliable enough to operate the controller circuitry 202, and the input voltage 208 is used to power the controller circuitry 202. If the output 210 of the power stage circuitry 204 has stabilized or the predetermined voltage has been reached, the controller circuitry 202 may select the output voltage 210 of the power stage circuitry 204 to power itself. The selected power source 308 is then provided to power delivery circuitry 304 to convert the selected power source 308 into power usable by the gate drivers, sensing signals and controller circuitry 306. The gate drivers, sensing signals and control circuitry 306 generate signals 206 to control the power stage circuitry 204. The control circuitry 306 may also receive the output voltage 210 of the IBC 104 to help generate the signals 206 needed to generate the predetermined voltage and stabilize the output 210 of the IBC 104. In certain implementations, the control circuitry 306 provides signals 312 to the power selection circuitry 302 to help determine whether the output voltage 210 of the power stage circuitry 204 has stabilized and reached the predetermined voltage.

Figure 4:
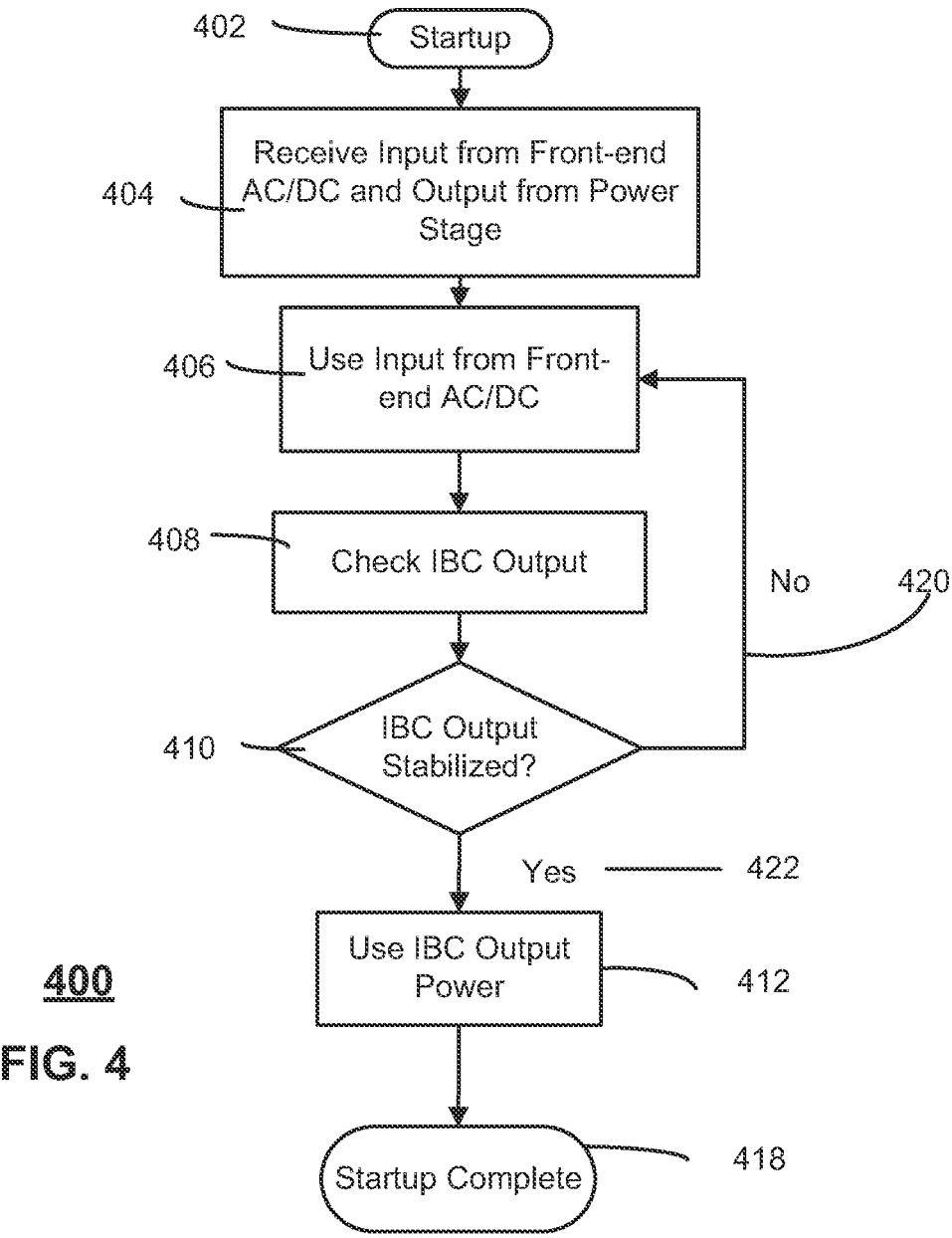
FIG. 4 is a flow chart depicting a startup process of a controller circuitry of an IBC, according to an illustrative implementation of the disclosure.

FIG. 4 shows a flow chart depicting the startup process of the controller circuitry 202 of the intermediate bus converter circuitry 104, according to an illustrative implementation of the disclosure. During startup, when the output 210 of the power stage circuitry 204 of the IBC 104 has not stabilized and has not reached a predetermined output voltage, the input voltage 208 is used as a source of power. However, the input voltage 208 may be at a higher value than is typically needed, and using it may reduce the power efficiency of the IBC 104.

Startup process 400 receives the input voltage 110 from the front-end AC/DC converter circuitry 102 and the output voltage 210 of the power stage circuitry 204 of the IBC 104 (step 404). During startup, the power selection circuitry 302 initially selects the input voltage 208 to be used. The controller circuitry 202 then uses the input voltage 208 to power the different circuitry within the controller circuitry 202 (step 406). The controller circuitry 202 checks the output voltage 210 of the IBC (step 408) and determines whether the output voltage 210 of the IBC 104 has stabilized and whether the output voltage 210 has reached a predetermined voltage (step 410). Controller circuitry 202 may perform the checks of output voltage 210 of the IBC continuously or periodically based on a predetermined time interval. If the output voltage 210 of the IBC 104 has not stabilized or reached a predetermined voltage (step 420), the controller circuitry 202 continues to use the input voltage 208 from the front-end AC/DC converter circuitry 102 (step 406). If the output voltage 210 of the IBC 104 has stabilized and reached a predetermined voltage (step 422), the power selection circuitry 302 selects the output voltage 210 from the power stage circuitry 204 to be used by the controller circuitry 202 (step 412). The controller circuitry 202 stops using the input voltage 208 and uses the output voltage 210 to power the different circuitry within controller circuitry 202. In certain implementations, the controller circuitry 202 utilizes both the input voltage 208 and output voltage 210 to provide a continuous and clean transition between the two voltages. Startup may be deemed complete (step 418) once the power to the controller circuitry 202 transitions from the input voltage 208 from the front-end AC/DC converter 102 to the output voltage 210 from the power stage circuitry 204 of the IBC 104.

Figure 5:
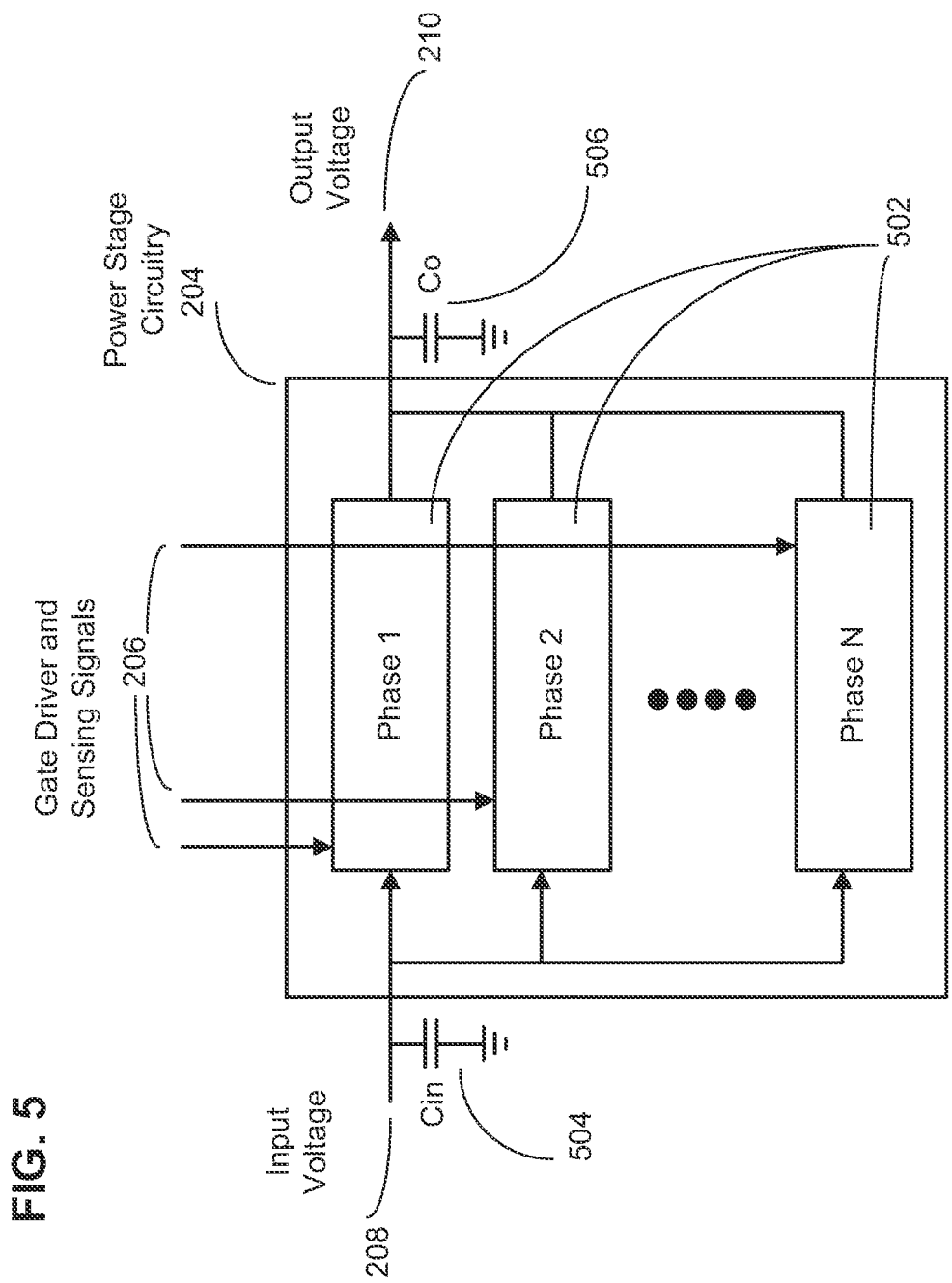
FIG. 5 is a block diagram depicting an implementation of the power stage circuitry within an IBC, according to an illustrative implementation of the disclosure.

FIG. 5 shows a block diagram depicting multiphase implementation of the power stage circuitry 204 within the intermediate bus converter (IBC) circuitry 104, according to an illustrative implementation. The power stage circuitry 204 of the IBC 104 converts the input DC voltage 110 received from the front-end AC/DC converter circuitry 102 to a lower DC voltage 112. The power stage circuitry 204 includes a non-isolated multiphase converter including at least one of a multi-phase buck converter and multi-phase buck-boost converter. The multi-phase converter includes multiple phase circuitry 502. The number of phases is determined by the maximum needed power consumption plus a power consumption margin. The power consumption margin may be pre-determined or generated based on the maximum needed power consumption. Each phase 502 is configured to be on or off depending on the power demand that the IBC 104 requires. The IBC 104 may determine how many phases 502 to use and when to switch the phases on and off. The IBC 104 may control the phases 502 based on desired power efficiency. For example, by utilizing less number of phases 502 during low power demands and more number of phases during high power demands, higher power efficiency may be achieved. By switching the phases 502 on and off, the IBC 104 may also respond to load changes quickly. Moreover, because the load current is split among multiple phases 502, heat loss across the switches within the phase circuitry 502 is lowered thus improving the power efficiency of the IBC 104. As noted earlier, the gate drivers and sensing signals 206 generated by the controller circuitry 202 control the operation of the power stage circuitry 204. These gate drivers and sensing signals 206 may direct the phases 502 to turn on and off at different times in order to provide the power and voltage needed by the system. Each phase 502 may receive the input DC voltage 208 and communicate with one or more other phases 502 to produce an output DC voltage 210. The input DC voltage 208 may be stored in input capacitor Cin 504 and the output voltage 210 may be stored in output capacitor Co 506.

Figure 6:
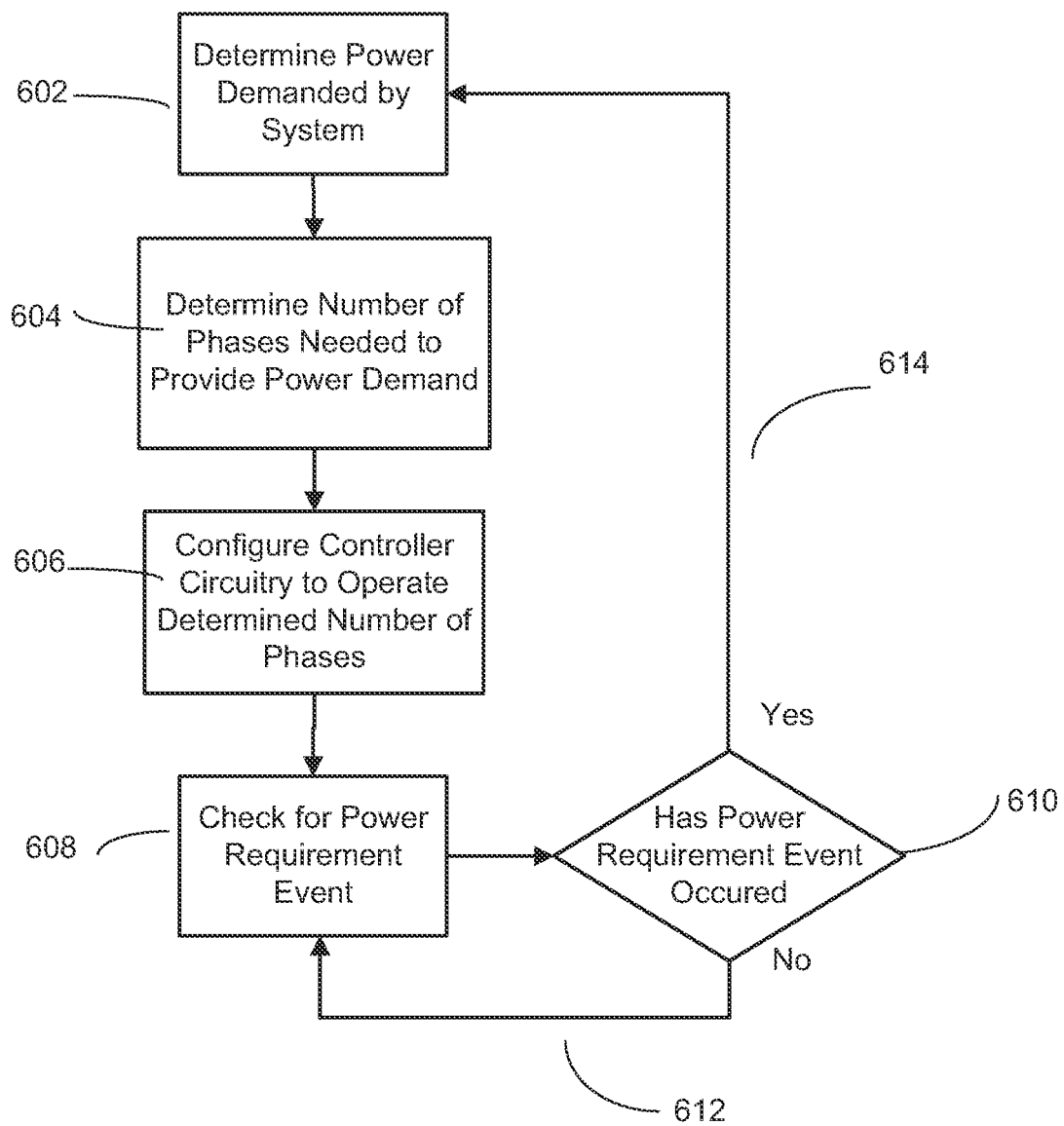
FIG. 6 is a flow chart depicting a process of configuring controller circuitry to select the number of phases to use and to generate the gate driving and sensing signals used to control the plurality of phases, according to an illustrative implementation of the disclosure.

FIG. 6 shows a flow chart depicting the process of configuring the controller circuitry 202, according to an illustrative implementation. The number of phases 502 that the power stage circuitry 204 of the IBC 104 should operate may be dependant on the power demanded by the system. In order to provide the power demanded by the system, the controller circuitry 202 determines the power demand required by the system (Step 602). The power demand may be indicated by external signals generated by other control circuitry which monitors or predicts the power demand of the system. After determining the power demand required by the system, the number of phases 502 needed to provide that power demand is determined (Step 604). In certain implementations, determining the number of phases 502 includes calculating or deriving the number of phases 502 based on the power demand. For example, for a given power demand, the number of phases may be derived such that a fewer number of phases are used during low power demands than those used during high power demands. In certain implementations, the number of phases may be determined using a lookup table, which for a given power demand, the number of phases is determined. In another implementation, the number of phases is calculated based on a function which maps a given power demand with a number of phases. The controller circuitry 202 is then configured to deliver the signals 206 required to operate the different phases 502 of the multi-phase converter in the power stage circuitry 204 (Step 606). The controller circuitry 202 checks whether a power requirement event has occurred (Step 608). A power requirement event indicates a change in power demand required by the system. The change in power demand may be predicted or determined based on information relayed to the IBC from the system. For example, a compute processor may be a system component powered by the IBC. When the compute processor is required to operate at maximum utilization of its resources, the amount of power required by the compute processor may be much greater, compared to typical operation. A power requirement event may be generated to indicate to the IBC that a greater power demand may be needed. In another example, when the amount of power required by the compute processor is less than the currently provided power by the IBC, a power requirement event may be generated to indicate to the IBC that a lower power demand may be needed. Until a power requirement event occurs (step 610), the controller circuitry 202 continues using the same configured phase configuration (step 612). If a power requirement event has occurred (Step 610), the process determines the new power demanded by the system and repeats the process to determine the phase information.

In certain implementations, the total number of phase circuitry in the power stage circuitry of the IBC may be determined by the maximum power consumption. For example, if the maximum power consumption by the system is 1200 W, wherein 100 A at 12V is required, then 4 phases may be present in the power stage circuitry. Each phase may provide 25 A at 12V. Initially, all 4 of the phases may be turned on in the power stage circuitry. When the controller circuitry 202 detects the total output current is only 20 A at 12V, the controller circuitry 202 may direct the power stage circuitry to shut down 3 of the phases, leaving 25 A at 12V available which is sufficient to meet the demanded power requirement. If the power required begins to increase, the system may turn on phases in order to meet the increased demand. The controller circuitry 202 may also direct the power stage circuitry to turn on multiple phases if the system demands an even greater amount of power.

Figure 7:
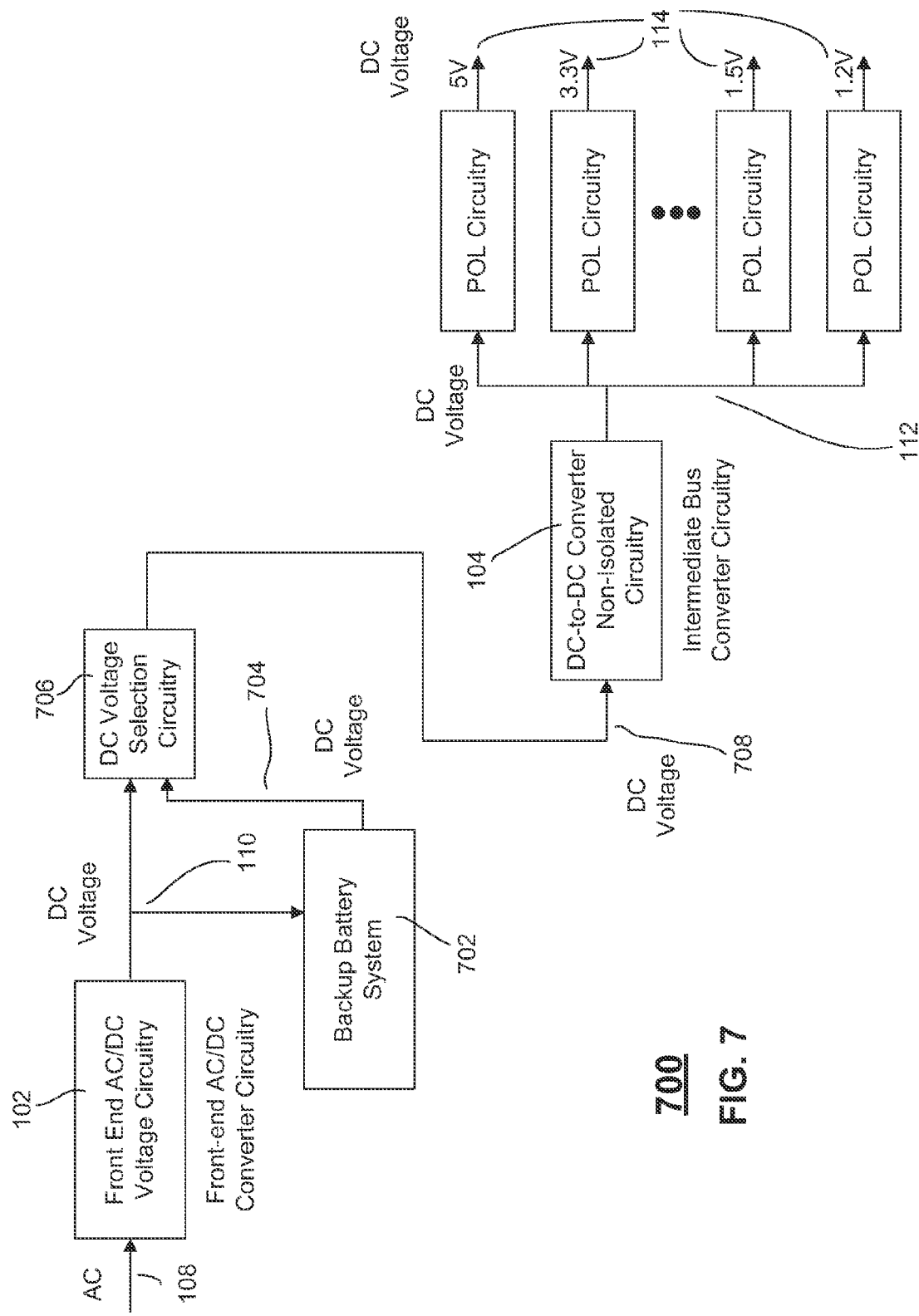
FIG. 7 is a block diagram depicting an implementation of an intermediate bus architecture with backup battery circuitry, according to an illustrative implementation of the disclosure.

FIG. 7 shows a block diagram depicting an implementation of intermediate bus architecture 700 with backup battery circuitry 702, according to an illustrative implementation of the disclosure. Intermediate bus architecture 700 includes backup battery circuitry 702. The front-end AC/DC converter circuitry 102 converts AC input voltage 108 into front-end DC voltage 110. Front-end DC voltage 110 is delivered to DC voltage selection circuitry 706, which selects a DC source voltage 708 to deliver to intermediate bus converter (IBC) 104. Backup battery circuitry 702 also receives front-end DC voltage 110 and may charge the battery cells within backup battery circuitry 702 using front-end DC voltage 110. Backup battery circuitry 702 generates a backup battery DC voltage 704 and provides the backup battery DC voltage 704 to DC voltage selection circuitry 706. Backup battery circuitry 702 may include one or more battery cells coupled together.

DC voltage selection circuitry 706 selects between the front-end DC voltage 110, provided by front-end AC/DC converter circuitry 102, and the backup battery DC voltage 704, provided by the backup battery circuitry 702, and delivers the selected DC source voltage 708 to IBC 104. In certain implementations, DC voltage selection circuitry 706 may initially select and provide the front-end DC voltage 110 to IBC 104. DC voltage selection circuitry 706 determines which of the DC voltages to deliver based on whether a power event has occurred. Power events indicate power failures, which may affect the voltage of front-end DC voltage 110 delivered to DC voltage selection circuitry 706. A power failure may indicate that a previous stage, such as the front end AC/DC voltage circuitry 102, is functioning in an undesirable manner causing front-end DC voltage 110 to no longer provide a desired pre-determined voltage. The power failure may occur in any stage, such as from the distribution center, and may also be caused by the connections that deliver the power between different components. Another example of a power failure is power outages, which would cause front-end DC voltage 110 to fail to provide the pre-determined voltage. In certain implementations, a power failure may indicate that the front-end DC voltage 110 is providing a voltage greater than the pre-determined voltage plus a first threshold voltage, or a voltage less than the pre-determined voltage minus a second threshold voltage. The first and second threshold voltage may be the same value or different values.

When a power event occurs, i.e. power failure, the backup battery circuitry 702 may provide backup battery DC voltage 704 to DC voltage selection circuitry 706, and DC voltage selection circuitry 706 may deliver power received from backup battery circuitry 702 to IBC 104, providing a reliable and stable source voltage for a certain amount of time. Backup battery circuitry 702 may either turn on in response to the power event or remain continuously on and provide backup battery DC voltage 704 to DC voltage selection circuitry 706. When front-end DC voltage 110 is able to provide the pre-determined voltage, DC voltage selection circuitry 706 may select front-end DC voltage 110 to be delivered to IBC 104. This may be in response to a different power event, which indicates that a power failure is no longer occurring.

In certain implementations, the datacenter may include power failure control circuitry which monitors the front-end DC voltage 110. The power failure control circuitry may compare front-end DC voltage 110 to a pre-determined voltage and determine if the front-end DC voltage 110 deviates from the desired pre-determined voltage by a DC voltage threshold. If the front-end DC voltage 11 deviates outside the range of the pre-determined voltage and the DC voltage threshold, the power failure control circuitry may indicate to DC voltage selection circuitry 706 to select and deliver backup battery DC voltage 704 to IBC 104. The DC voltage selection circuitry 706 receives the indication from the power failure control circuitry and selects the DC voltage which is indicated by the power failure control circuitry. The range of the pre-determined voltage and the DC voltage threshold may be between, and also may be inclusive, the pre-determine voltage plus the DC voltage threshold and the pre-determined voltage minus the DC voltage threshold. Once the power failure control circuitry determines that the front-end DC voltage 110 is within a DC voltage threshold of the pre-determined voltage, the power failure control circuitry may indicate to the DC voltage selection circuitry 706 to select and provide front-end DC voltage 110 to IBC 104.

Because IBC 104 is implemented as a non-isolated multi-phase converter, the backup battery circuitry 702 allows the backup battery DC voltage 704 to drop in order to provide longer backup battery time. The non-isolated multi-phase converter structure of the IBC 104 allows the input voltage range of operation to be large compared to the input voltage range of isolated converter structures, which have a limited input range due to the fixed transformer turns-ratio used within them. Generally, as long as the input voltage delivered to the non-isolated IBC 104 is greater than the output voltage produced, the IBC 104 is still able to provide the output voltage required. This allows the backup battery circuitry 702 to be designed in such a way as to allow the backup battery DC voltage 704 to drop as the charge stored in the battery decreases. This allows the battery to have a longer backup time than normally possible with an isolated IBC. Without non-isolated IBC 104, the backup battery circuitry 702 would have to be built with more battery capacity to achieve the same backup time. Increasing the battery capacity would require a larger form factor and more battery cells.

Figure 8:
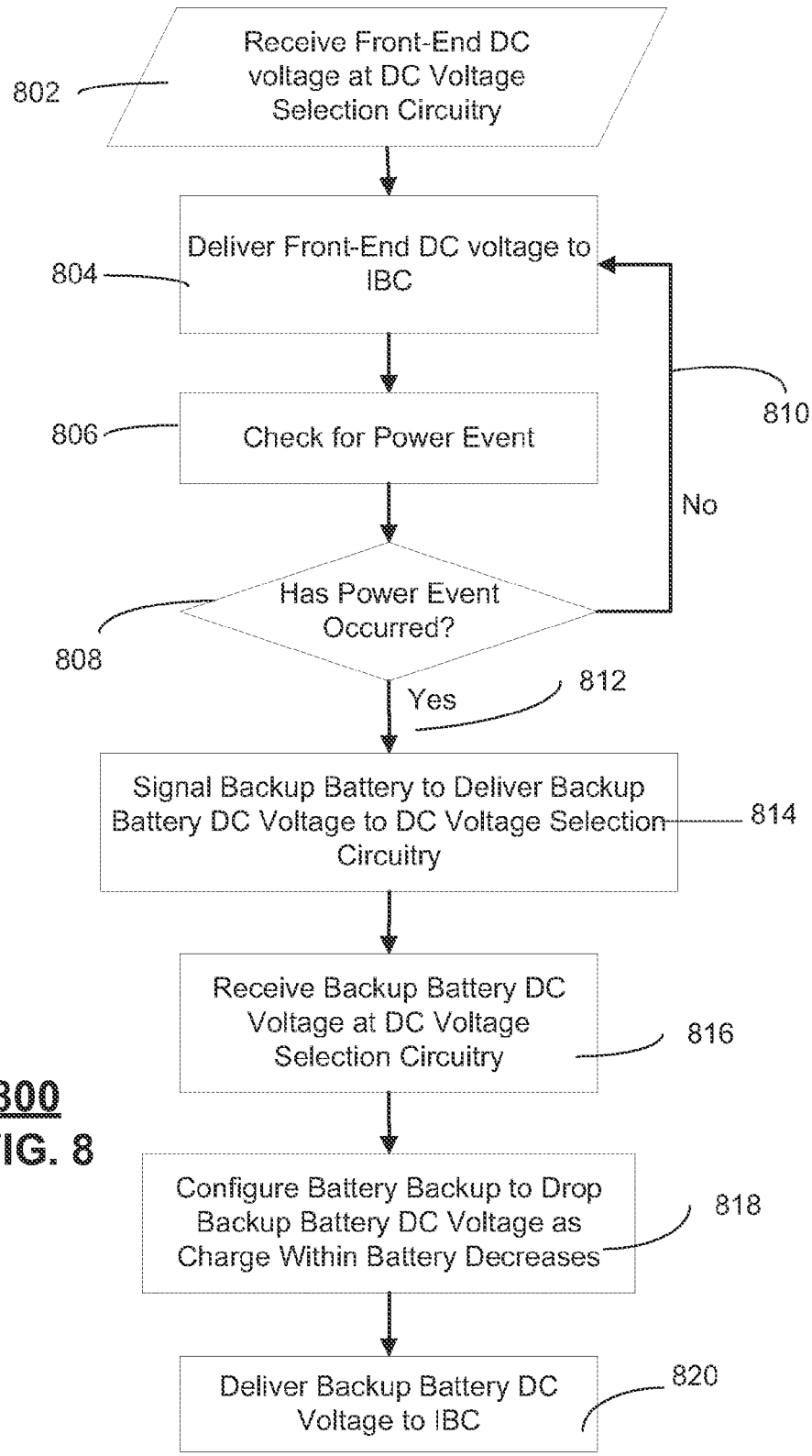
FIG. 8 is a flow chart depicting a process of selecting a power source in communication with an IBC, according to an illustrative implementation of the disclosure.

FIG. 8 shows a flow chart depicting the process 800 of selecting which power source the intermediate bus converter circuitry 104 will receive from, according to an illustrative implementation of the disclosure. The DC voltage selection circuitry 706 selects whether to provide power from backup battery circuitry 702 or front-end AC/DC converter circuitry 102. The DC voltage selection circuitry 706 receives the front-end DC voltage 110 from the front-end AC/DC converter circuitry 102 (Step 802), selects front-end DC voltage 110 to be delivered, and delivers front-end DC voltage 110 to the IBC 104 (Step 804). The DC voltage selection circuitry 706 then determines whether a power event has occurred (Step 806). If a power event has not occurred (Step 810) then the DC voltage selection circuitry 706 continues to deliver the front-end DC voltage 110 from the front-end AC/DC converter circuitry 102 to the IBC 104. If a power event has occurred (Step 812), the DC voltage selection circuitry 706 sends a signal to the backup battery circuitry 702 to deliver backup battery DC voltage 704 (Step 814). If the backup battery circuitry 702 is configured to continuously provide backup battery DC voltage 704 to the DC voltage selection circuitry 706, then step 814 may not be performed and the backup battery DC voltage 704 of the backup battery circuitry 702 is also received at step 802. Otherwise, after the backup battery circuitry 702 has turned on, the DC voltage selection circuitry 706 receives the backup battery DC voltage 704 from the backup battery circuitry 702 (Step 816). At this point the backup battery circuitry 702 may be configured to drop the backup battery DC voltage 704 as the charge within the backup battery circuitry 702 decreases (Step 818). The DC voltage selection circuitry 706 selects backup battery DC voltage 704 to be delivered, and delivers the backup battery DC voltage 704 from the backup battery circuitry 702 to the IBC 104 (Step 820). Configuration and use of the backup battery DC voltage 704 of the backup battery circuitry 702 may occur simultaneously.

It will be apparent to one of ordinary skill in the art that aspects of the present disclosure, as described above, may be implemented in many different forms of software, firmware, and hardware in the implementations illustrated in the figures. The actual software code or specialized control hardware used to implement aspects consistent with the principles of the disclosure is not limiting of the disclosure. Thus, the operation and behavior of the aspects of the disclosure were described without reference to the specific software code—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. Further, certain components may provide power or voltage directly to another component, but there may be intermediate components between the source and destination. Therefore, a power or voltage received at a destination component may be based on the power or voltage from the source component. In certain circumstances, multitasking and parallel processing may be advantageous. Further, certain portions of the disclosure may be implemented as "logic" or a "component" that performs one or more functions. This logic may include hardware, such as an application specific integrated circuit or a field programmable gate array, software, or a combination of hardware and software. In certain circumstances, power and voltage may be interchangeably used.

The invention claimed is:

1. An intermediate bus converter for use in a datacenter, comprising:
   power stage circuitry, comprising a non-isolated converter, configured to convert a DC source voltage to one or more DC output voltages; and
   controller circuitry configured to receive both the DC source voltage and the DC output voltage, and generate an at least one control signal to control the operation of the power stage circuitry, the controller circuitry further includes power selection circuitry configured to, during a startup process:
      initially select the DC source voltage as a source of power for the controller circuitry;
      monitor at least one DC output voltage among the one or more DC output voltages to determine if the DC output voltage has stabilized; and
      only in response to the at least one DC output voltage stabilizing, selecting the at least one DC output voltage as the source of power for the controller circuitry.

2. The converter of claim 1, wherein the non-isolated converter includes a multiphase converter comprising a plurality of phase circuitry.

3. The converter of claim 2, wherein the at least one control signal further controls the operation of the plurality of phase circuitry, and wherein the controller circuitry is further configured to:
   determine a first power demand, wherein the first power demand is the amount of power that the intermediate bus converter is expected to produce;
   determine a number of phase circuitry among the plurality of phase circuitry needed to provide the determined first power demand; and
   control the operation of the determined number of phase circuitry.

4. The converter of claim 3, wherein the controller circuitry is further configured to:
   determine whether a power requirement event has occurred; and
   determine a second power demand, determine a second number of phase circuitry among the plurality of phase circuitry needed to provide the determined second power demand, and control the operation of the determined second number of phase circuitry if a power requirement event has occurred.

5. The converter of claim 4, wherein the power requirement event indicates whether the power demanded by the intermediate bus converter has changed.

6. The converter of claim 1, wherein the controller circuitry includes power delivery circuitry to convert the selected power source into a power source usable by the controller circuitry.

7. The converter of claim 6, wherein the controller circuitry includes gate driver, sensing signals and control circuitry for generating the at least one control signal to control the operation of the power stage circuitry.

8. The converter of claim 1, wherein the non-isolated converter includes at least one of a buck converter, a boost converter, or a buck-boost converter.

9. The converter of claim 1, wherein the non-isolated converter comprises a synchronous converter.

10. A method for operating an intermediate bus converter, the method comprising:
    receiving a DC source voltage;

generating, using controller circuitry, an at least one control signal;

controlling the operation of power stage circuitry using the at least one control signal, wherein the power stage circuitry comprises a non-isolated converter; and converting the DC source voltage to one or more DC output voltages using the power stage circuitry, and further comprising:

initially selecting during a startup the DC source voltage as a source of power for the controller circuitry;

monitor at least one DC output voltage among the one or more DC output voltages to determine if the DC output voltage has stabilized; and only in response to the at least one DC output voltage stabilizing, selecting the at least one DC output voltage as the source of power for the controller circuitry.

11. The method of claim 10, wherein the non-isolated converter includes a multiphase converter comprising a plurality of phase circuitry.

12. The method of claim 11, wherein controlling the operation of the power stage circuitry further comprises:

determining a power demand, wherein the power demand is the amount of power that the intermediate bus converter is expected to produce;

determining a number of phase circuitry among the plurality of phase circuitry needed to provide the determined power demand;

generating at least one phase control signal using the controller circuitry; and controlling the operation of the determined number of phase circuitry using the at least one phase control signal.

13. The method of claim 12, wherein controlling the operation of the power stage circuitry further comprises:

determining whether a power requirement event has occurred; and in response to determining a power requirement event has occurred, determining a second power demand, and further determining a second number of phase circuitry among the plurality of phase circuitry needed to provide the determined second power demand.

14. The method of claim 13, wherein the power requirement event indicates whether the power demanded by the IBC has changed.

15. A datacenter, comprising:

a front-end AC-to-DC converter configured to receive a high voltage AC signal of greater than 100 volts and generate a DC front-end voltage;

a non-isolated intermediate bus converter, comprising:

power stage circuitry configured to receive a DC source voltage based on the DC front-end voltage and generate a DC output voltage; and controller circuitry connected to the power stage circuitry and configured to receive both the DC source voltage and the DC output voltage and generate a control signal to control the operation of the power stage circuitry, the controller circuitry further including power selection circuitry configured to, during a startup process:

initially select the DC source voltage as a source of power for the controller circuitry;

monitor at least one DC output voltage among the one or more DC output voltages to determine if the DC output voltage has stabilized; and only in response to the at least one DC output voltage stabilizing, selecting the at least one DC output voltage as the source of power for the controller circuitry;

a plurality of point-of-load converters configured to receive the DC output voltage; and a plurality of network elements in communication with the point-of-load converters.

* * * * *